US009983665B2

(12) United States Patent
Hall

(10) Patent No.: US 9,983,665 B2
(45) Date of Patent: May 29, 2018

(54) POSITION TRACKING SYSTEM THAT EXPLOITS ARBITRARY CONFIGURATIONS TO DETERMINE LOOP CLOSURE

(71) Applicant: Oculus VR, LLC, Menlo Park, CA (US)

(72) Inventor: Michael Hall, Seattle, WA (US)

(73) Assignee: Oculus VR, LLC, Menlo Park, CA (US)

( * ) Notice: Subject to any disclaimer, the term of this patent is extended or adjusted under 35 U.S.C. 154(b) by 33 days.

(21) Appl. No.: 15/334,216

(22) Filed: Oct. 25, 2016

(65) Prior Publication Data
US 2018/0113506 A1    Apr. 26, 2018

(51) Int. Cl.
| | | |
|---|---|---|
| *G06F 3/01* | (2006.01) | |
| *G06F 3/03* | (2006.01) | |
| *G02B 27/00* | (2006.01) | |
| *G02B 27/01* | (2006.01) | |
| *G06T 19/00* | (2011.01) | |

(52) U.S. Cl.
CPC ......... *G06F 3/012* (2013.01); *G02B 27/0093* (2013.01); *G02B 27/0172* (2013.01); *G06F 3/0304* (2013.01); *G02B 2027/014* (2013.01); *G02B 2027/0178* (2013.01); *G06T 19/006* (2013.01)

(58) Field of Classification Search
CPC .............. G02B 27/017; G02B 27/0172; G02B 27/0176; G02B 27/0093; G02B 2027/0132–2027/0136; G02B 2027/0174; G02B 2027/0178; G06F 3/012; G06F 3/013; H04N 13/0429–13/044; H04N 5/7491

See application file for complete search history.

(56) References Cited

U.S. PATENT DOCUMENTS

| | | | | |
|---|---|---|---|---|
| 2013/0117377 | A1* | 5/2013 | Miller ................. | H04L 67/38 709/205 |
| 2016/0131761 | A1* | 5/2016 | Yates .................. | G01S 1/70 356/3.11 |
| 2016/0187974 | A1* | 6/2016 | Mallinson .......... | G06F 3/014 463/32 |
| 2016/0267884 | A1* | 9/2016 | Binstock ............ | G09G 5/373 |
| 2016/0316336 | A1* | 10/2016 | Krenz ................ | G09B 19/003 |
| 2017/0039959 | A1* | 2/2017 | Mallinson .......... | G06F 3/011 |
| 2017/0182414 | A1* | 6/2017 | Oishi ................ | A63F 13/428 |
| 2017/0308159 | A1* | 10/2017 | Yoon .................. | G06F 3/013 |
| 2017/0308166 | A1* | 10/2017 | Mallinson .......... | G06F 3/014 |

* cited by examiner

*Primary Examiner* — Priyank Shah
(74) *Attorney, Agent, or Firm* — Fenwick & West LLP

(57) ABSTRACT

A position tracking system includes an array of detection pixels coupled to a head-mounted display (HMD) configured to capture light signals reflected from an environment surrounding the HMD. The position tracking system maintains, in a database, signal data related to a plurality of positions of the HMD. The position tracking system determines signal data related to a position of the HMD, based on the light signals captured during a time instant of the position of the HMD. The position tracking system matches the determined signal data to the maintained signal data, determines a present position of the HMD based on the matching, updates position data of the HMD with the determined position, and provides the updated position data of the HMD.

30 Claims, 4 Drawing Sheets

POSITION TRACKING SYSTEM THAT EXPLOITS ARBITRARY CONFIGURATIONS TO DETERMINE LOOP CLOSURE

BACKGROUND

The present disclosure generally relates to localization of a user's position and orientation in virtual reality (VR), augmented reality (AR) and mixed reality (MR) systems, and specifically relates to a position tracking system that exploits arbitrary configurations for loop closure determination.

An important part of achieving compelling user experiences in VR, AR and MR systems relies on localizing a user's position and orientation in an arbitrary environment. Typically, the localization of user's position and orientation in an arbitrary environment can be based on a class of computer vision algorithms known as a simultaneous localization and mapping (SLAM) process. The SLAM process typically utilizes a certain combination of cameras, depth sensors, and/or internal measurement units (IMUs) to estimate, for example, a six degree-of-freedom (6DOF) pose, which facilitates maneuvering through a space and mapping of a surrounding environment.

The estimates of a user's position and/or orientation in an arbitrary environment obtained based on the SLAM process drift over time causing inconsistencies when a user enters a space that has been explored previously because a present environment disagrees with a previous view from the same orientation. A common approach to handle this problem is the "loop closure," which is based on continuously monitoring whether a user has observed a present position and orientation at some previous time instant. The loop closure typically includes maintaining a list of prior orientations and comparing a user's present view with a complete set or a subset of views that were previously explored. The comparison of present views with a history of all prior views or a subset of prior views is a computationally challenging task, which becomes more difficult as a user explores a wider volume of spaces.

SUMMARY

A position tracking system includes an array of sensor elements placed around a head-mounted display (HMD) for virtual reality (VR), augmented reality (AR) and/or mixed reality (MR) applications. In some embodiments, the sensor elements are photodiodes or pixels that capture data from an arbitrary real world environment. The position tracking system coupled to the HMD utilizes the captured data to facilitate closing a loop in a simultaneous localization and mapping (SLAM) process, thereby enabling the HMD to effectively address inconsistencies that can occur when the HMD enters a space that has been previously explored and/or mapped.

In some embodiments, a position tracking system includes an array comprising a plurality of detection pixels coupled to an HMD configured to capture light signals reflected from an environment surrounding the HMD. The position tracking system further includes a controller with a database. The controller maintains, in the database, signal data related to a plurality of positions of the HMD in the environment. The controller also determines signal data related to a position of the HMD in the environment, based on the light signals captured during a time instant of the position of the HMD. The controller compares the determined signal data to the maintained signal data, and determines a present position of the HMD based on the matching. The position tracking system updates position data of the HMD with the determined position and provides the updated position data of the HMD.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Disclosed embodiments include a position tracking system for determining loop closure for localizing a user's position and orientation in an arbitrary environment, which can be implementation at a head-mounted display (HMD). The HMD may be a part of, e.g., a virtual reality (VR) system, an artificial reality (AR) system, a mixed reality (MR) system, or some combination thereof. The position tracking system for determining loop closure can comprise an array of sensor elements that exploit arbitrary configurations to determine the loop closure.

System Overview

Figure 1:
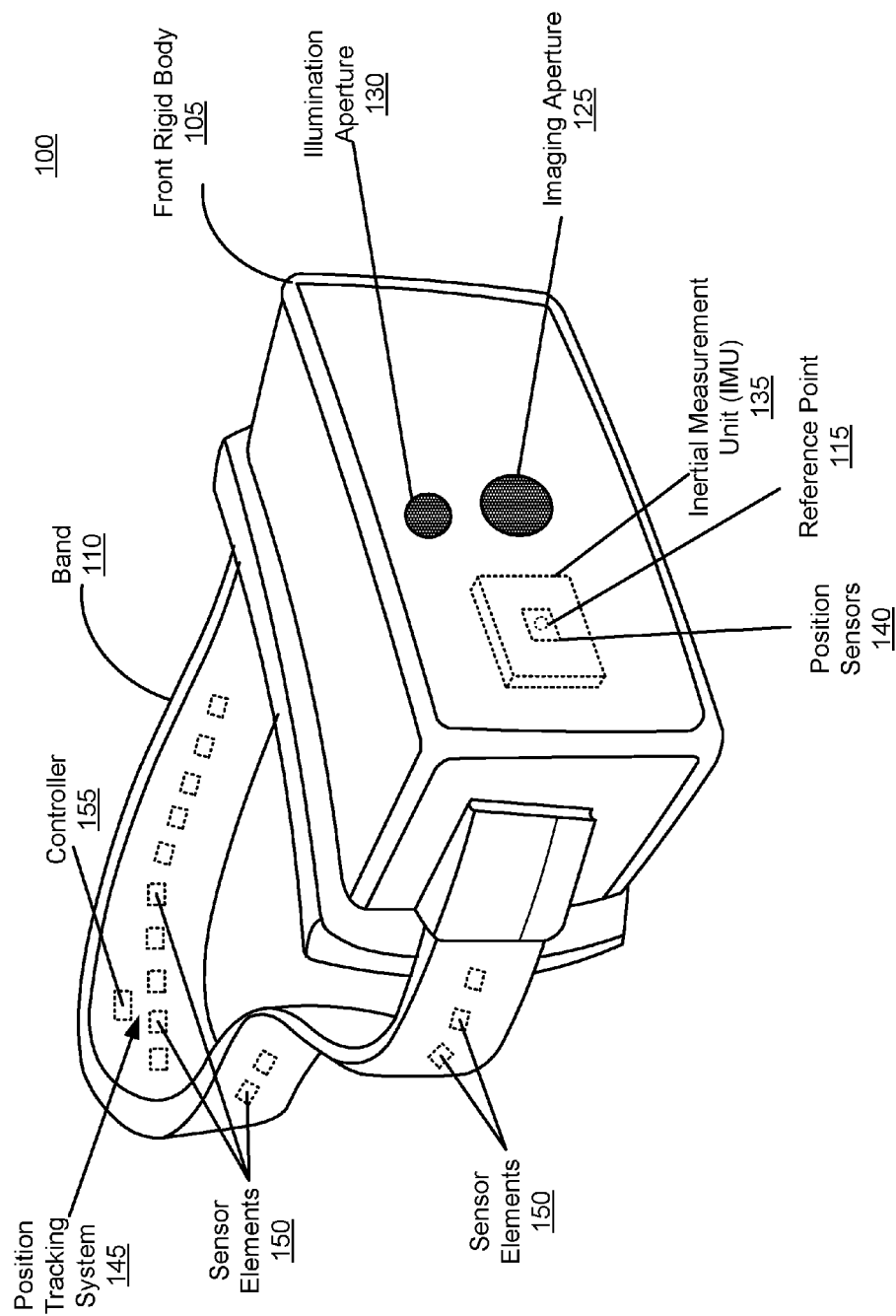
FIG. 1 is a diagram of a head-mounted display (HMD), in accordance with an embodiment.

FIG. 1 is a diagram of a HMD 100, in accordance with an embodiment. The HMD 100 includes a front rigid body 105, a band 110, and a reference point 115. The HMD 100 shown in FIG. 1 also includes an embodiment of a depth camera assembly (DCA) and depicts an imaging aperture 125 and an illumination aperture 130. Some embodiments of the DCA include an imaging device, and an illumination source. The illumination source emits light through an illumination aperture 130. The imaging device captures light from the illumination source and ambient light in the local area through an imaging aperture 125. In some embodiment, light emitted from an illumination source through the illumination aperture 130 comprises a structured light pattern.

In one embodiment, the front rigid body 105 includes one or more electronic display elements (not shown in FIG. 1), an Inertial Measurement Unit (IMU) 135, one or more position sensors 140, and the reference point 115. In the embodiment shown by FIG. 1, the position sensors 140 are located within the IMU 135, and neither the IMU 135 nor the position sensors 140 are visible to a user. The IMU 135 is an electronic device that generates fast calibration data based on measurement signals received from one or more of the position sensors 140. A position sensor 140 generates one or more measurement signals in response to motion of the HMD 100. Examples of position sensors 140 include: one or more accelerometers, one or more gyroscopes, one or more magnetometers, another suitable type of sensor that detects motion, a type of sensor used for error correction of the IMU 135, or some combination thereof. The position sensors 140 may be located external to the IMU 135, internal to the IMU 135, or some combination thereof.

An important part of achieving compelling user experiences in a VR, AR or MR system that includes the HMD 100 relies on localization of a user's position and orientation in an arbitrary environment. In some embodiments, the HMD 100 includes a position tracking system 145 for determining loop closure for localizing a user's position and orientation in an arbitrary environment. The position tracking system 145 comprises an array of sensor elements (e.g., detection pixels) 150 and a controller 155. The sensor elements 150 can be placed at various positions along the HMD 100. The positions can include positions on the front rigid body 105, the band 110, or some combination thereof. In one embodiment, as illustrated in FIG. 1, the array of sensor elements 150 can be implemented as an array of sensors 150 placed at the band 110. In another embodiment (not shown in FIG. 1), the sensor elements 150 are arranged in an array (e.g., hemispherical array) that may be at least partially integrated into the front rigid body 105 encompassing a top of a user's head. Moreover, the controller 155 may also be incorporated into the front rigid body 105 (or some other portion of the HMD 100). In yet another embodiment (not shown in FIG. 1), the sensor elements 150 can be arranged in a ring and placed around a user's head on which the HMD 100 is mounted. In yet another embodiment (not shown in FIG. 1), an HMD may be implemented as a pair of glasses, and the sensor elements 150 can be positioned along a frame of the glasses. The sensor elements 150 can be also distributed around the exterior of a hand-held controller device or other hand-held devices, such as pens, gloves, laser pointers, etc. (not shown in FIG. 1). In some embodiments, the hand-held controller device and/or other hand-held devices can operate within a system that includes the HMD 100. In some other embodiments, the hand-held controller device and/or other hand-held devices can operate as movable objects independently of the HMD 100. In some embodiments, the sensor elements 150 can be positioned fixed relative to each other, and their calibration may depend on a particular arrangement of the sensor elements 150. In general, the sensor elements 150 can be arranged in an array of detectors that is integrated into the HMD 100, wherein geometry of the array can be arbitrary and cover a wide angular span of an environment. The geometry of the array of sensor elements 150 is thus not constrained to being planar, rectilinear, or uniformly spaced. In some embodiments, the geometry of the array of sensor elements 150 can be customized for a desired field of view and resolution of captured signal data.

In some cases, multiple high resolution depth camera assemblies (DCAs) can be used in the HMD 100 for the same purpose as the position tracking system 145. However, the configuration shown in FIG. 1 based on the position tracking system 145 with the array of sensor elements is less resource/hardware intensive. For example, in an embodiment, each sensor element 150 can be a single photodiode or pixel (with an optional micro-lens) that captures light reflected from an environment, wherein light can be emitted from an illumination source through the illumination aperture 130. The HMD 100 and the position tracking system 145 uses the captured reflected light to perform a loop closure in a simultaneous localization and mapping (SLAM) process in order to address inconsistencies that occur when the HMD 100 enters an environment that has been previously explored and/or mapped. The SLAM based approach provides estimates of a user's position and orientation in an arbitrary environment while utilizing signal data that cover a wide field of view of the environment. To achieve a low computational complexity of the loop closure in the SLAM process, the position tracking system 145 uses a small number of sensor elements 150 located in a wide field of view. In some embodiments, the position tracking system 145 comprises only tens, hundreds or thousands of pixels 150. In contrast, conventional systems utilize certain combination of high resolution cameras, depth sensors, and/or IMUs to perform the loop closure in the SLAM process, which is much more resource/hardware intensive than the configuration shown in FIG. 1. Types of the sensor elements 150 are disclosed in detail below with regard to FIG. 2.

Typically, the HMD 100 includes a single very high resolution DCA with a relatively narrow field of view, which can be used to obtain information about a position and orientation of the HMD 100 in an arbitrary environment. However, when a user wearing the HMD 100 moves quickly through an environment, a blur can be present between consecutive views (or frames) of the environment displayed to the user because the system is not able to efficiently stitch a current user's view (current frame) of the environment with past views (previous frames) of the same environment. To avoid having the blur between consecutive user's views (frames) of the environment, the HMD 100 utilizes information about the environment obtained by the position tracking system 145 having the sensor elements 150 pointing to different directions for providing sparse depths of various positions and orientations in a wide field of view of the environment. In contrast, conventional systems typically include silicon-array mega-pixel cameras (e.g., IR cameras, color cameras, etc.), depth sensors, and/or IMUs pointing to different directions, in addition to a very high resolution DCA with a relatively narrow field of view, which is much more resource/hardware intensive than the configuration shown in FIG. 1.

Estimates of localization of position and orientation of the HMD 100 in an arbitrary environment obtained based on a very high resolution DCA with a relatively narrow field of view and the position tracking system 145 may drift over time. This drift causes inconsistencies when a user wearing the HMD 100 enters a space that has been explored previously since a present environment disagrees with a previous view from the same orientation. In some embodiments, the position tracking system 145 can apply the loop closure to eliminate the drift and inconsistencies. In an illustrative embodiment, a user wearing the HMD 100 moves through an arbitrary environment in a large circle, and, at some time instant, the user returns to a starting position. However, a view of the environment displayed to the user can have inconsistencies due to the drift. In some embodiments, the position tracking system 145 determines, based on a current view of a surrounding space and previously captured views, that the user is currently located at the starting position, i.e., the loop closure is determined. Based the loop closure determination, the HMD 100 eliminates inconsistencies in a displayed view of an environment. More details about structure and operation of the position tracking system 145 within the HMD 100 are disclosed herein in relation to FIGS. 2-3.

Position Tracking System for Loop Closure Determination

Figure 2:
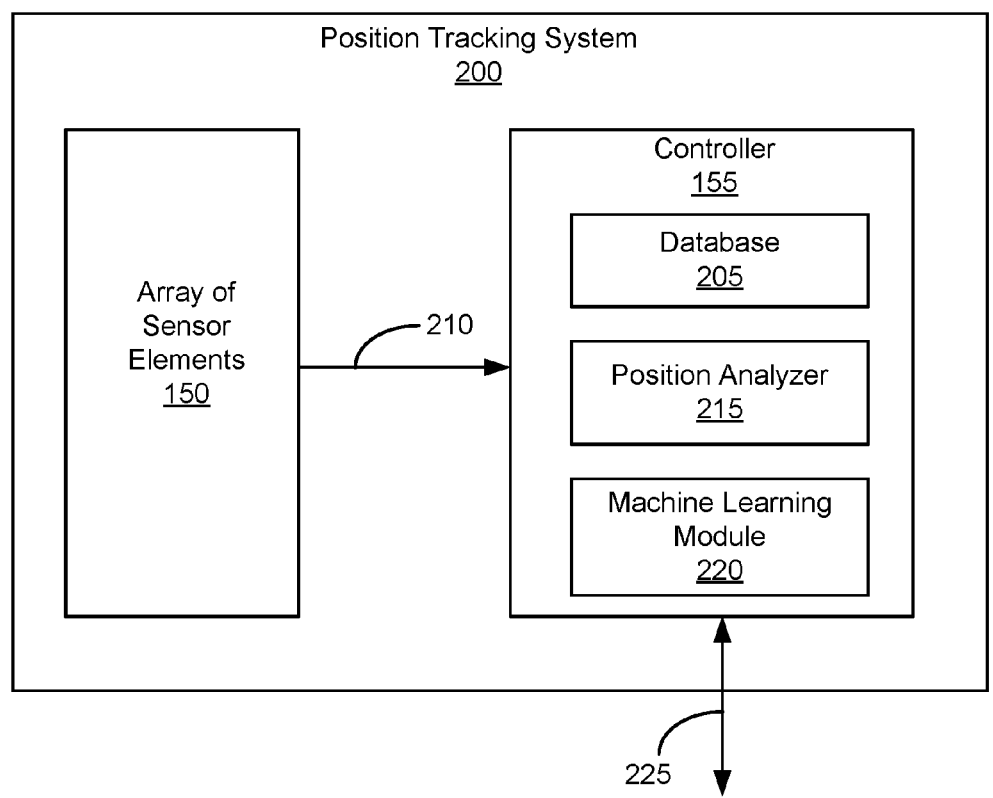
FIG. 2 is a block diagram of a position tracking system implemented at the HMD shown in FIG. 1, in accordance with an embodiment.

FIG. 2 is a block diagram of a position tracking system 200 that may be implemented at the HMD 100 shown in FIG. 1, in accordance with an embodiment. The position tracking system 200 is an embodiment of the position tracking system 145 shown in FIG. 1. As illustrated in FIG. 2, the position tracking system 200 comprises two main components, i.e., the array of sensor elements 150 and the controller 155 shown in FIG. 1. In some embodiments, the sensor elements 150 may be single pixels or photodiodes, small or large arrays of pixels, or a combination of individual pixel elements and small/large arrays of pixels. Some of the sensor elements 150 may be traditional sensor arrays, and other sensor elements 150 may be single elements or a small number of single elements. In some embodiments, the position tracking system 200 performs the loop closure based on continuously monitoring whether a user wearing the HMD 100 has observed a present position and orientation at some previous time instant. The loop closure includes maintaining information about prior user's locations and orientations in an environment, which may be stored in the database 205. The position tracking system 200 captures (e.g., via the array of sensor elements 150) signal data related to a user's present location and orientation in an environment (e.g., a present position of the HMD 100 in an environment). The captured signal data can be communicated to the controller 155 via an interface 210. Some embodiments of the controller 155 have different modules than those described here. Similarly, the functions can be distributed among the modules in a different manner than is described here. The controller 155 comprises a database 205, a position analyzer 215, and a machine learning module 220.

The database 205 stores signal data of previously captured scenes, such as user's views of an environment captured by the array of sensor elements 150. In some embodiments, the database 205 includes a look up table (LUT). The LUT stores a plurality of strings of binary numbers (e.g., ferns), wherein each fern stored in the LUT is a compressed version of an image of a scene captured by the array of sensor elements 150 at a particular time instant. Each fern can be stored in a separate entry of the LUT, and can be assigned to a unique timestamp that corresponds to a time instant when signal data for that fern (view of an environment) was captured. Thus, an entry number in the LUT may correspond to a timestamp of a fern stored in that entry.

The position analyzer 215 analyzes one or more positions of the position tracking system 200. The position analyzer 215 may be configured to determine whether the present user's position and orientation (i.e., directional viewpoint) in the environment is approximately same as some previous position and orientation, i.e., whether the present user's position and/or orientation is within some defined proximity to a prior position and/or view of the environment. The position analyzer 215 matches signal data related to the user's present position and/or orientation with the signal data stored in the database 205 related to a complete set or a subset of views and positions that were previously explored and stored in the database 205. If the matching is within a certain threshold value, the position analyzer 215 determines that the present user's position and/or orientation is approximately same as in some previous time instant, i.e., the position analyzer 215 determines the loop closure. Otherwise, the position analyzer 215 determines that the present user's position and/or orientation is a new position/orientation in the environment and stores the signal data related to the new position/orientation into the database 205. In some embodiments, the signal data related to the new position/orientation may be in the form of a string of binary numbers (e.g., fern) captured by the array of sensors 150. In an embodiment, a fern related to the new position/orientation can be stored in a next available entry of the LUT in the database 205 following an entry of the LUT that was last written.

By employing the ferns instead of full-resolution frames, the computation complexity of the loop closure is significantly reduced, making it feasible to apply the loop closure for every set of data captured by the array of sensor elements 150 and compare a current view with all previous views maintained in the database 205 that are stored in the LUT as a plurality of ferns. Instead of matching high resolution frames for every user's location, the position analyzer 215 matches a newly captured fern related to a user's present position and orientation with ferns related to a complete set of positions and orientations that were previously explored and stored in the LUT. As each fern represents a string of binary numbers, computational complexity of the matching performed by the position analyzer 215 is reduced to computational complexity of bit-level operations. If the matching is within a certain threshold value (e.g., an upper bound for a number of different bits in ferns), the position analyzer 215 determines that a present user's position/orientation in an environment is approximately same one as in a past time instant, and determines a timestamp that corresponds to a fern of that past position/orientation. Otherwise, the position analyzer 215 determines that the present position/orientation is a new position/orientation and stores a fern related to the new position/orientation into the database 205.

The machine learning module 220 is configured to compress an amount of information required to match a user's present view against a subset of key views previously observed (e.g., by extracting only macroscopic non-redundant features of observed scenes). To compress the amount of information, the machine learning module 220 generates a collection of ferns, where each fern can be generated based on bit-level comparisons between signal data captured by the sensor elements 150. In one embodiment, the comparisons can be based on whether an intensity of a light signal captured by one sensor element 150 is greater or less than other intensity of other light signal captured by some other sensor element 150. In another embodiment, the comparisons can be based on whether an intensity of a light signal captured by a sensor element 150 is greater or less than a pre-determined threshold level. In yet another embodiment, the comparisons can be based on whether a difference between intensities of light signals captured by a pair of sensor elements 150 is greater or less than a pre-determined threshold level. The machine learning module 220 performs the comparisons to generate ferns, wherein the comparisons can act as a classifier of macroscopic information contained in a scene, collecting essential information from the scene that does not require redundancy of pixels across mega-pixel cameras used in conventional systems. Optionally, the machine learning module 220 can further compress the generated ferns into even shorter strings of binary numbers. In some embodiments, the entire procedure of calibrating thresholds and evaluating different comparisons is performed by the machine learning module 220 within an initial machine learning calibration. Once the calibration is complete, preferred threshold levels and comparisons are held fixed on the position tracking system 200 and used for determining the loop closure.

If a potential match is found, i.e., if the loop closure is determined, full resolution frames that correspond to the found match can be explored more thoroughly using all the information that was captured previously. In some embodiments, the controller 155 sends, via an interface 225, the determined timestamp to a host with a memory (not shown in FIG. 2) that comprises information about high resolution frames related to different views of an environment or a set of environments. In an embodiment, the host is a DCA implemented at the HMD 100 that includes a processor coupled to a memory that stores full resolution frames captured by the DCA. The host's processor can be configured to retrieve, based on the timestamp obtained from the position tracking system 200 through the interface 225, at least one high resolution frame obtained by the DCA. The host's processor further combines the at least one retrieved high resolution frame with information about a present user's position/orientation to generate updated position/orientation data without the aforementioned inconsistences and drifts. Exchanging only timestamps of frames between the position tracking system 200 and the host separate from the position tracking system 200 substantially lowers a bandwidth of information exchange between the position tracking system 200 and the host compared to the conventional approaches. Handling the entirety of the fern-based LUT procedure at a local hardware of the position tracking system 200 (i.e., the controller 155) also removes the need to handle the computation on the host, freeing up critical resources for other computer vision processing. In some other embodiments, one or more operations performed by the host can be performed by one or more sub-modules of the controller 155.

In an illustrative embodiment, the machine learning module 220 performs the aforementioned calibration to determine a preferred length of binary strings. For example, the preferred length of resulting binary strings (ferns) is 10 bits. Thus, each "frame" captured by the array of sensor elements 150 is analyzed by the calibration procedure, which produces a 10-bit binary string (fern). This string represents a compressed identifier of the surrounding environment. For example, the following are hypothetical binary strings (ferns) that may be output over time: frame 0001 {fern: 0010011011}, frame 0002 {fern: 0010111010}, frame 0003 {fern: 0010011010}, . . . , frame 1004 {fern: 0010011011}, . . . , frame 9085 {fern: 0010011011}. It can be observed that ferns related to the frames 1004 and 9085 both match a fern related to the frame 0001. Therefore, the frames 9085, 1004 and 0001 can potentially correspond to approximately same position and/or orientation in the environment. As more frames are accumulated, these frames can be added to the LUT in the database 205 in the following way:

| Binary String | Frame Numbers Matched (or Timestamps) |
|---|---|
| {0000000000} | { } |
| {0000000001} | { } |
| ... | |
| {0010011011} | {0001, 1004, 9085} |
| ... | |

Each time a new frame is acquired, the position tracking system 200 checks the acquired new frame against all previous frames that recorded the same binary string. In this way extraordinarily large amount of information can be checked quickly in a compressed way. For each potentially matching frame from the LUT in the database 205, the position tracking system 200 may analyze a high resolution dataset that corresponds to that frame to check for the loop closure, wherein the high resolution dataset may be retrieved from the DCA. Thus, for the illustrative embodiment, if frames {0001, 1004, 9085} are potential matches, the position tracking system 200 only analyzes high resolution datasets for three frames instead of for all 10,000 or even more frames that were captured.

The configuration presented in FIG. 1 based on the array of sensor elements 150 fully exploits advantages of the fern collection and analysis approach presented herein. The collected ferns do not require densely sampled images in the traditional sense. Thus, a cost, complexity, size, and power of image capturing apparatus built into the HMD 100 are substantially reduced in comparison with conventional systems that include multiple high resolution cameras and sensors. The array of sensor elements 150 is designed specifically to cover a wide field of view of a user's environment to accommodate the presented fern collection and analysis. The array of sensor elements 150 explores a wide configuration space which improves the scene matching capability. Being able to arrange sensor elements 150 in the array over very wide field of view and combine a variety of different sensing modalities into the array of sensor elements 150 eliminates the need for mega-pixel cameras or sensors altogether.

In one embodiment, the array of sensor elements 150 comprises an array of image sensors. In another embodiment, the array of sensor elements 150 comprises one dense silicon sensor with multiple photodiodes. In yet another embodiment, the array of sensor elements 150 comprises an array of single color pixels. In yet another embodiment, the array of sensor elements 150 comprises an array of single intensity photodiodes capturing an intensity of light. In yet another embodiment, the array of sensor elements 150 comprises an array of sensor elements that measure polarization and/or depth in relation to light reflected from a surrounding environment. The array of sensor elements 150 may comprise different types of pixels. In contrast, conventional systems employ different types of expensive silicon-array mega-pixel cameras. In an illustrative embodiment, an entire silicon sensor (or camera) for depth detection and an entire silicon sensor (or camera) for polarization detection employed in conventional systems can be replaced with, for example, ~100 pixels for depth detection and ~1,000 pixels for intensity detection. In some embodiments, the array of sensor elements 150 comprises a variety of different sensor elements, such as IR sensors, red-green-blue (RGB) or color sensors, depth sensors, polarization sensors, reflectivity sensors, etc.

Figure 3:
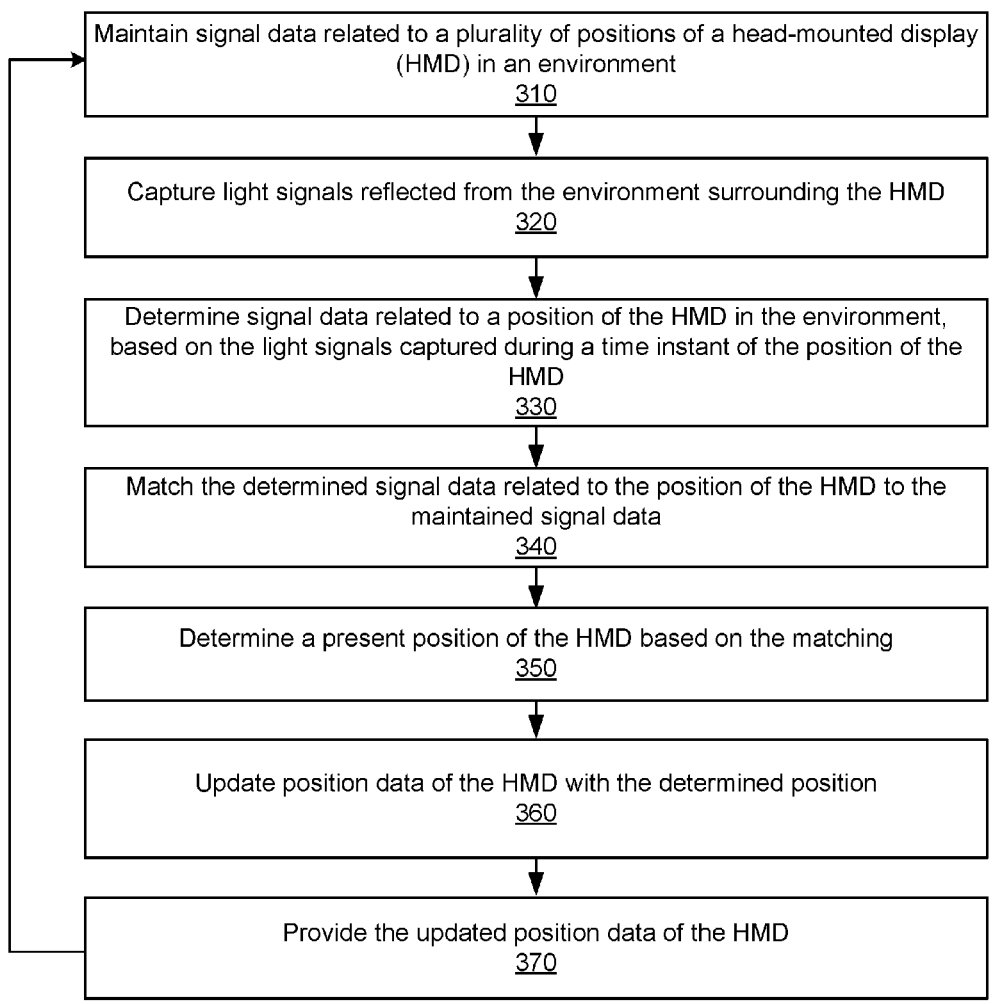
FIG. 3 is a flow chart illustrating a process of a loop closure determination performed by a position tracking system implemented at the HMD shown in FIG. 1, in accordance with an embodiment.

FIG. 3 is a flow chart illustrating a process 300 of a loop closure determination that may be implemented at the HMD 100 shown in FIG. 1, in accordance with an embodiment. The process 300 of FIG. 3 may be performed by the components of the position tracking system 200 shown in FIG. 2. Other entities may perform some or all of the steps of the process in other embodiments. Likewise, embodiments may include different and/or additional steps, or perform the steps in different orders.

The position tracking system 200 maintains 310 (e.g., in the database 205 of the controller 155) signal data related to a plurality of positions and/or orientations of the HMD in an environment. In some embodiments, the maintained signal data comprise a plurality of strings of binary numbers (e.g., ferns) stored in the LUT. The plurality of strings is obtained by the array of sensor elements 150. Each string of the plurality of strings has a timestamp corresponding to a time instant of a position of the HMD in the environment.

The position tracking system 200 captures 320 (e.g., via the array of sensor elements 150 shown in FIG. 1) light signals reflected from an environment surrounding the HMD.

The position tracking system 200 determines 330 (e.g., via the controller 155) signal data related to a position and/or orientation of the HMD in the environment, based on the light signals captured during a time instant of the position of the HMD. In some embodiments, the position tracking system 200 (e.g., via the controller 155) generates a string of binary numbers (e.g., fern) based on the light signals captured by the array of sensor elements 150. The string of binary numbers comprises compressed information about the position and/or orientation of the HMD in the environment.

The position tracking system 200 matches 340 (e.g., via the controller 155) the determined signal data related to the position and/or orientation of the HMD to the maintained signal data. In some embodiments, the position tracking system 200 performs matching 340 by performing bit-level comparisons between the string of binary numbers generated 330 related to the present position and/or orientation of the HMD and the plurality of strings of binary numbers stored in the LUT related to a set of previous positions and/or orientations of the HMD.

The position tracking system 200 determines 350 a present position and/or orientation of the HMD based on the matching 340. If the matching 340 is within a threshold value, the position tracking system 200 determines 350 that the present position and/or orientation of the HMD is approximately same as one of the plurality of positions and/or orientations, i.e., the loop closure is determined. In some embodiments, as the matching 340 is performed based on the bit-level comparisons, the position tracking system 200 determines 350 a timestamp of a string of binary numbers (e.g., fern) that corresponds to a past position/orientation of the HMD that is approximately same as the present position/orientation of the HMD in the environment. If the matching 340 is not within the threshold value, the position tracking system 200 determines 350 that the present position and/or orientation of the HMD is a new position/orientation. In an embodiment, the captured signal data related to the new position/orientation of the HMD can be stored into the LUT as a string of binary numbers.

The position tracking system 200 updates 360 position data of the HMD with the determined position/orientation. In an embodiment, the position tracking system 200 sends the determined timestamp to a host device of the HMD comprising existing stored data of the environment. Based on the determined timestamp, the host device associates the stored data of the environment with information about the determined position/orientation to update the position data of the HMD. In another embodiment, the position tracking system 200 retrieves, from the host device based on the determined timestamp, information about the existing stored data of the environment and generates the updated position data of the HMD based on associating the stored data of the environment with information about the determined position/orientation.

The position tracking system 200 provides 370 the updated position data of the HMD. As the user continues to move through the environment, the position tracking system 200 continuously performs the loop closure determination and repeats operations 310-370. The process 300 of the loop closure determination shown in FIG. 3 is not necessarily related only to HMDs. The loop closure determination presented herein can be also used for controllers or other hand-held devices (e.g., pens, pointers, gloves, etc.) that may operate independently of HMDs.

System Environment

Figure 4:
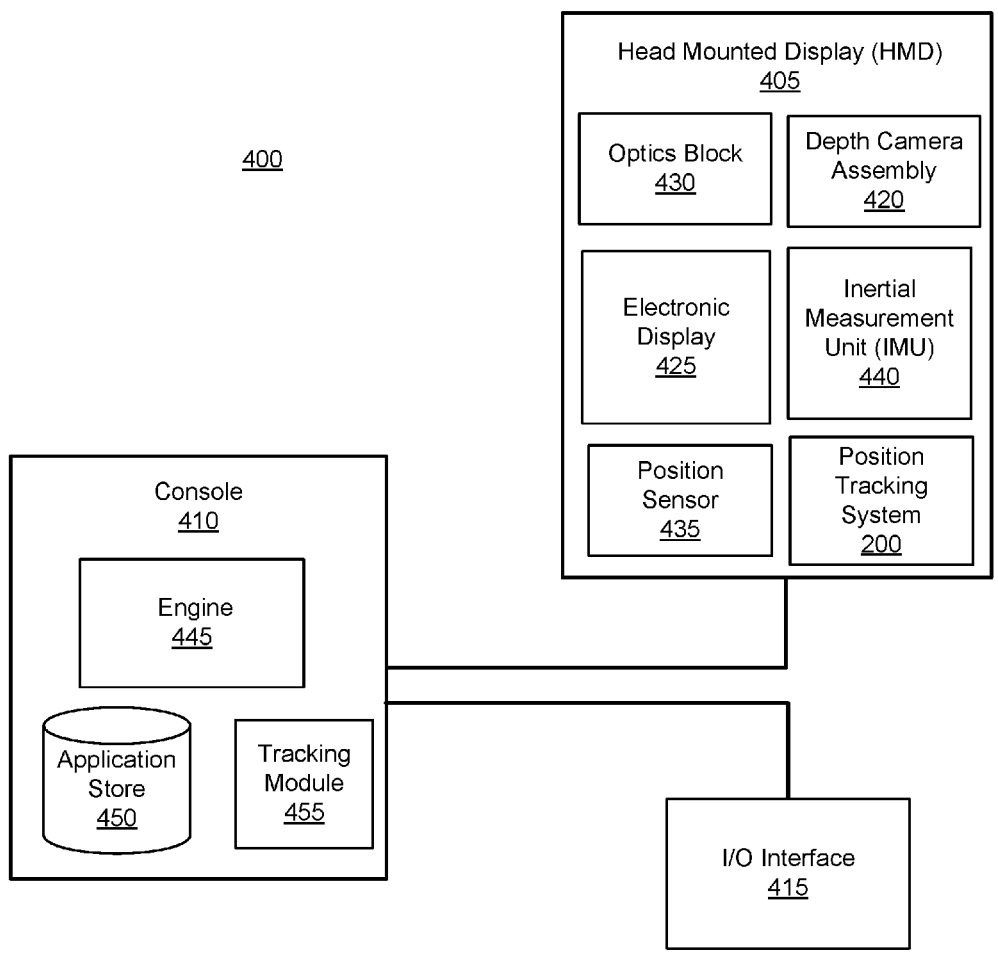
FIG. 4 is a block diagram of a system environment that includes the HMD shown in FIG. 1, in accordance with an embodiment.

FIG. 4 is a block diagram of one embodiment of a system environment 400 in which a console 410 operates. The system 400 may operate in a VR system environment, an AR system environment, a MR system environment, or some combination thereof. The system environment 400 shown by FIG. 4 comprises a HMD 405 and an input/output (I/O) interface 415 that is coupled to the console 410. While FIG. 4 shows an example system 400 including one HMD 405 and on I/O interface 415, in other embodiments any number of these components may be included in the system environment 400. For example, there may be multiple HMDs 405 each having an associated I/O interface 415, with each HMD 405 and I/O interface 415 communicating with the console 410. In alternative configurations, different and/or additional components may be included in the system environment 400. Additionally, functionality described in conjunction with one or more of the components shown in FIG. 4 may be distributed among the components in a different manner than described in conjunction with FIG. 4 in some embodiments. For example, some or all of the functionality of the console 410 is provided by the HMD 405.

The HMD 405 is a head-mounted display that presents content to a user comprising virtual and/or augmented views of a physical, real-world environment with computer-generated elements (e.g., two dimensional (2D) or three dimensional (3D) images, 2D or 3D video, sound, etc.). In some embodiments, the presented content includes audio that is presented via an external device (e.g., speakers and/or headphones) that receives audio information from the HMD 405, the console 410, or both, and presents audio data based on the audio information. The HMD 405 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 405 is the HMD 100 described above in conjunction with FIG. 1.

The HMD 405 includes a DCA 420, an electronic display 425, an optics block 430, one or more position sensors 435, and an IMU 440. The HMD 405 may further include the position tracking system 200 described above in conjunction with FIG. 2. Some embodiments of the HMD 405 have different components than those described in conjunction with FIG. 4. Additionally, the functionality provided by various components described in conjunction with FIG. 4 may be differently distributed among the components of the HMD 405 in other embodiments.

The DCA 420 captures data describing depth information of an area surrounding the HMD 405. The data describing depth information may be associated with one or a combination of the following techniques used to determine depth information: structured light (SL), time-of-flight (ToF), or some combination thereof. The DCA 420 can compute the depth information using the data, or the DCA 420 can send this information to another device such as the console 410 that can determine the depth information using data from the DCA 420.

The DCA 420 includes an illumination source, an imaging device, and a controller. The illumination source emits light onto an area surrounding the HMD. The illumination source includes a plurality of emitters on a single substrate. The imaging device captures ambient light and light from one or more emitters of the plurality of emitters of the plurality of emitters that is reflected from objects in the area. The controller coordinates how the illumination source emits light and how the imaging device captures light. In some embodiments, the controller may also determine depth information associated with the local area using the captured images.

The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), a vertical-cavity surface-emitting laser (VCSEL), or some other source. In some embodiments, the plurality of emitters emits light having a structured light pattern.

The electronic display 425 displays 2D or 3D images to the user in accordance with data received from the console 410. In various embodiments, the electronic display 425 comprises a single electronic display or multiple electronic displays (e.g., a display for each eye of a user). Examples of the electronic display 425 include: a liquid crystal display (LCD), an organic light emitting diode (OLED) display, an active-matrix organic light-emitting diode display (AMO-LED), some other display, or some combination thereof.

The optics block 430 magnifies image light received from the electronic display 425, corrects optical errors associated with the image light, and presents the corrected image light to a user of the HMD 405. In various embodiments, the optics block 430 includes one or more optical elements. Example optical elements included in the optics block 430 include: an aperture, a Fresnel lens, a convex lens, a concave lens, a filter, a reflecting surface, or any other suitable optical element that affects image light. Moreover, the optics block 430 may include combinations of different optical elements. In some embodiments, one or more of the optical elements in the optics block 430 may have one or more coatings, such as partially reflective or anti-reflective coatings.

Magnification and focusing of the image light by the optics block 430 allows the electronic display 425 to be physically smaller, weigh less and consume less power than larger displays. Additionally, magnification may increase the field of view of the content presented by the electronic display 425. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optics block 430 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 425 for display is pre-distorted, and the optics block 430 corrects the distortion when it receives image light from the electronic display 425 generated based on the content.

The IMU 440 is an electronic device that generates data indicating a position of the HMD 405 based on measurement signals received from one or more of the position sensors 435 and from depth information received from the DCA 420. A position sensor 435 generates one or more measurement signals in response to motion of the HMD 405. Examples of position sensors 435 include: one or more accelerometers, one or more gyroscopes, one or more magnetometers, another suitable type of sensor that detects motion, a type of sensor used for error correction of the IMU 440, or some combination thereof. The position sensors 435 may be located external to the IMU 440, internal to the IMU 440, or some combination thereof.

Based on the one or more measurement signals from one or more position sensors 435, the IMU 440 generates data indicating an estimated current position of the HMD 405 relative to an initial position of the HMD 405. For example, the position sensors 435 include multiple accelerometers to measure translational motion (forward/back, up/down, left/right) and multiple gyroscopes to measure rotational motion (e.g., pitch, yaw, roll). In some embodiments, the IMU 440 rapidly samples the measurement signals and calculates the estimated current position of the HMD 405 from the sampled data. For example, the IMU 440 integrates the measurement signals received from the accelerometers over time to estimate a velocity vector and integrates the velocity vector over time to determine an estimated current position of a reference point on the HMD 405. Alternatively, the IMU 440 provides the sampled measurement signals to the console 410, which interprets the data to reduce error. The reference point is a point that may be used to describe the position of the HMD 405. The reference point may generally be defined as a point in space or a position related to the HMD's 405 orientation and position.

The IMU 440 receives one or more parameters from the console 410. The one or more parameters are used to maintain tracking of the HMD 405. Based on a received parameter, the IMU 440 may adjust one or more IMU parameters (e.g., sample rate). In some embodiments, certain parameters cause the IMU 440 to update an initial position of the reference point so it corresponds to a next position of the reference point. Updating the initial position of the reference point as the next calibrated position of the reference point helps reduce accumulated error associated with the current position estimated the IMU 440. The accumulated error, also referred to as drift error, causes the estimated position of the reference point to "drift" away from the actual position of the reference point over time. In some embodiments of the HMD 405, the IMU 440 may be a dedicated hardware component. In other embodiments, the IMU 440 may be a software component implemented in one or more processors.

The I/O interface 415 is a device that allows a user to send action requests and receive responses from the console 410. An action request is a request to perform a particular action. For example, an action request may be an instruction to start or end capture of image or video data or an instruction to perform a particular action within an application. The I/O interface 415 may include one or more input devices. Example input devices include: a keyboard, a mouse, a game controller, or any other suitable device for receiving action requests and communicating the action requests to the console 410. An action request received by the I/O interface 415 is communicated to the console 410, which performs an action corresponding to the action request. In some embodiments, the I/O interface 415 includes an IMU 440 that captures calibration data indicating an estimated position of the I/O interface 415 relative to an initial position of the I/O interface 415. In some embodiments, the I/O interface 415 may provide haptic feedback to the user in accordance with instructions received from the console 410. For example, haptic feedback is provided when an action request is received, or the console 410 communicates instructions to the I/O interface 415 causing the I/O interface 415 to generate haptic feedback when the console 410 performs an action.

The console 410 provides content to the HMD 405 for processing in accordance with information received from one or more of: the DCA 420, the HMD 405, and the I/O interface 415. In the example shown in FIG. 4, the console 410 includes an application store 450, a tracking module 455 and an engine 545. Some embodiments of the console 410 have different modules or components than those described in conjunction with FIG. 4. Similarly, the functions further described below may be distributed among components of the console 410 in a different manner than described in conjunction with FIG. 4.

The application store 450 stores one or more applications for execution by the console 410. An application is a group of instructions, that when executed by a processor, generates content for presentation to the user. Content generated by an application may be in response to inputs received from the user via movement of the HMD 405 or the I/O interface 415. Examples of applications include: gaming applications, conferencing applications, video playback applications, or other suitable applications.

The tracking module 455 calibrates the system environment 400 using one or more calibration parameters and may adjust one or more calibration parameters to reduce error in determination of the position of the HMD 405 or of the I/O interface 415. For example, the tracking module 455 communicates a calibration parameter to the DCA 420 to adjust the focus of the DCA 420 to more accurately determine positions of SL elements captured by the DCA 420. Calibration performed by the tracking module 455 also accounts for information received from the IMU 440 in the HMD 405 and/or an IMU 440 included in the I/O interface 415. Additionally, if tracking of the HMD 405 is lost (e.g., the DCA 120 loses line of sight of at least a threshold number of SL elements), the tracking module 455 may re-calibrate some or all of the system environment 400.

The tracking module 455 tracks movements of the HMD 405 or of the I/O interface 415 using information from the DCA 420, the one or more position sensors 435, the IMU 440 or some combination thereof. For example, the tracking module 455 determines a position of a reference point of the HMD 405 in a mapping of a local area based on information from the HMD 405. The tracking module 455 may also determine positions of the reference point of the HMD 405 or a reference point of the I/O interface 415 using data indicating a position of the HMD 405 from the IMU 440 or using data indicating a position of the I/O interface 415 from an IMU 440 included in the I/O interface 415, respectively. Additionally, in some embodiments, the tracking module 455 may use portions of data indicating a position or the HMD 405 from the IMU 440 as well as representations of the local area from the DCA 420 to predict a future location of the HMD 405. The tracking module 455 provides the estimated or predicted future position of the HMD 405 or the I/O interface 415 to the engine 445.

The engine 445 generates a 3D mapping of the area surrounding the HMD 405 (i.e., the "local area") based on information received from the HMD 405. In some embodiments, the engine 445 determines depth information for the 3D mapping of the local area based on information received from the DCA 420 that is relevant for techniques used in computing depth. The engine 445 may calculate depth information using one or more techniques in computing depth (e.g., SL, ToF, or some combination thereof). In various embodiments, the engine 445 uses different types of information determined by the DCA 420 or a combination of types of information determined by the DCA 420.

The engine 445 also executes applications within the system environment 400 and receives position information, acceleration information, velocity information, predicted future positions, or some combination thereof, of the HMD 405 from the tracking module 455. Based on the received information, the engine 445 determines content to provide to the HMD 405 for presentation to the user. For example, if the received information indicates that the user has looked to the left, the engine 445 generates content for the HMD 405 that mirrors the user's movement in a virtual environment or in an environment augmenting the local area with additional content. Additionally, the engine 445 performs an action within an application executing on the console 410 in response to an action request received from the I/O interface 415 and provides feedback to the user that the action was performed. The provided feedback may be visual or audible feedback via the HMD 405 or haptic feedback via the I/O interface 415.

In some embodiments, as discussed above in conjunction with FIGS. 1-2, the position tracking system 200 comprises the array of sensor elements 150 and the controller 155. The position tracking system 200 captures (via the sensor elements 150) light reflected from a surrounding area as a user wearing the HMD 405 maneuvers through an arbitrary environment. The reflected light may be emitted from an illumination source of the DCA 420 or from some other illumination source included in the HMD 405. The position tracking system 200 uses the captured reflected light signals to obtain strings of binary numbers or ferns that represent compressed version of frames, i.e., compressed versions of views of the environment. The ferns related to past positions and/or orientations of the HMD 405 are stored and maintained in a local database (e.g., the database 205 shown in FIG. 2), and each fern related to a unique timestamp of a position/orientation of the HMD 405. The position tracking system 200 performs the loop closure and determines a timestamp that has the most similar matches to a current user's view. In some embodiments, the position tracking system 200 provides information about the determined timestamp to the engine 445 of the console 410. The engine 445 retrieves, based on the received timestamp, corresponding full resolution frame(s) that may be captured by the DCA 420. The full resolution frame(s) may be stored at a memory of the console 410 or at a memory of the DCA 420 (not shown in FIG. 4). The engine 445 is further configured to stitch the full resolution frame(s) with a current user's view to obtained improved localization and mapping of a surrounding space without inconsistencies and drifts. The engine 445 can provide information about the improved localization and mapping to the HMD 405.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A position tracking system comprising:
an array comprising a plurality of detection pixels coupled to a head-mounted display (HMD) configured to capture light signals reflected from an environment surrounding the HMD; and
a controller, including a processor and a database, coupled to the array, the controller configured to:
maintain, in the database, signal data related to a plurality of positions of the HMD in the environment,
determine signal data related to a position of the HMD in the environment, based on the light signals captured during a time instant of the position of the HMD,
match the determined signal data to the maintained signal data,
determine a present position of the HMD based on the matching,
update position data of the HMD with the determined position, and
provide the updated position data of the HMD.

2. The system of claim 1, wherein the controller is further configured to:
determine that the present position of the HMD is the same as one of the plurality of positions of the HMD, if the matching is within a threshold value.

3. The system of claim 1, wherein the controller is further configured to:
determine that the present position of the HMD is a new position of the HMD in the environment, if the matching is not within a threshold value.

4. The system of claim 1, wherein:
the maintained signal data comprise a plurality of strings of binary numbers stored in the database obtained based on the light signals captured by the plurality of detection pixels during a plurality of time instants, each string has a unique timestamp corresponding to one of the plurality of time instants; and
the determined signal data comprise a string of binary numbers.

5. The system of claim 4, wherein the controller is further configured to:
perform bit-level comparisons between the string and the plurality of strings; and
determine, based on the bit-level comparisons, a timestamp corresponding to one of the plurality of time instants when the HMD was located in approximately the same position or had approximately the same orientation in the environment as during the time instant.

6. The system of claim 5, wherein the controller is further configured to:
send the determined timestamp to the HMD for associating with existing stored data of the environment.

7. The system of claim 5, wherein the controller is further configured to:
retrieve, from the HMD based on the determined timestamp, information about existing stored data of the environment; and
update the position data of the HMD based on the retrieved information.

8. The system of claim 1, wherein the processor is configured to generate a string of binary numbers based on comparing intensities of the captured light signals with a defined threshold level.

9. The system of claim 1, wherein the plurality of detection pixels in the array is arranged in a ring placed around a user's head where the HMD is mounted.

10. The system of claim 1, wherein the detection pixels in the array are positioned on a band of the HMD.

11. The system of claim 1, wherein the detection pixels in the array are positioned along a frame of glasses of the HMD.

12. The system of claim 1, wherein the detection pixels in the array are distributed around an exterior of a hand-held controller device that moves through the environment.

13. The system of claim 1, wherein the detection pixels in the array are positioned in fixed locations relative to each other.

14. The system of claim 1, wherein the detection pixels in the array are photodiodes.

15. The system of claim 1, wherein the detection pixels in the array measure at least one of polarization and depth.

16. The system of claim 1, wherein the plurality of detection pixels in the array comprises different types of detection pixels.

17. The system of claim 16, wherein the different types of detection pixels comprise at least two of: infra-red (IR) sensors, color sensors, depth sensors, polarization sensors, and reflectivity sensors.

18. A position tracking system comprising:
an array comprising a plurality of detection pixels coupled to a head-mounted display (HMD) configured to capture light signals reflected from an environment surrounding the HMD;

a controller, including a processor and a database, coupled to the array, the controller configured to:
  maintain, in the database, signal data related to a plurality of positions of the HMD in the environment,
  determine signal data related to a position of the HMD in the environment, based on the light signals captured during a time instant of the position of the HMD,
  match the determined signal data to the maintained signal data,
  determine, based on the matching, loop closure by determining that a present position of the HMD is the same as one of the plurality of positions,
  update position data of the HMD based on the determined loop closure, and
  provide the updated position data of the HMD.

19. The system of claim 18, wherein:
the maintained signal data comprise a plurality of strings of binary numbers stored in the database obtained based on the light signals captured by the plurality of detection pixels during a plurality of time instants, each string has a unique timestamp corresponding to one of the plurality of time instants; and
the determined signal data comprise a string of binary numbers.

20. The system of claim 19, wherein the controller is further configured to:
  perform bit-level comparisons between the string and the plurality of strings; and
  determine, based on the bit-level comparisons, a timestamp corresponding to one of the plurality of time instants when the HMD was located in approximately the same position or had approximately the same orientation in the environment as during the time instant.

21. The system of claim 18, wherein the plurality of detection pixels in the array is arranged in a ring placed around a user's head where the HMD is mounted.

22. The system of claim 18, wherein the detection pixels in the array are photodiodes.

23. A method for position tracking of a head-mounted display (HMD), the method comprising:
  capturing light signals reflected from an environment surrounding the HMD;
  maintaining signal data related to a plurality of positions of the HMD in the environment;
  determining signal data related to a position of the HMD in the environment, based on the light signals captured during a time instant of the position of the HMD;
  matching the determined signal data to the maintained signal data;
  determining a present position of the HMD based on the matching;
  updating position data of the HMD with the determined position; and
  providing the updated position data of the HMD.

24. The method of claim 23, further comprising:
determining that the present position of the HMD is the same as one of the plurality of positions of the HMD, if the matching is within a threshold value.

25. The method of claim 23, further comprising:
determining that the present position of the HMD is a new position of the HMD in the environment, if the matching is not within a threshold value.

26. The method of claim 23, wherein:
the maintained signal data comprise a plurality of strings of binary numbers obtained based on the light signals captured during a plurality of time instants, each string has a unique timestamp corresponding to one of the plurality of time instants; and
the determined signal data comprise a string of binary numbers.

27. The method of claim 26, further comprising:
performing bit-level comparisons between the string and the plurality of strings; and
determining, based on the bit-level comparisons, a timestamp corresponding to one of the plurality of time instants when the HMD was located in approximately the same position or had approximately the same orientation in the environment as during the time instant.

28. The method of claim 27, further comprising:
sending the determined timestamp to the HMD for associating with existing stored data of the environment.

29. The method of claim 27, further comprising:
retrieving, from the HMD based on the determined timestamp, information about existing stored data of the environment; and
updating the position data of the HMD based on the retrieved information.

30. The method of claim 23, further comprising:
generating a string of binary numbers based on comparing intensities of the captured light signals with a defined threshold level.

* * * * *